(12) United States Patent
Hao

(10) Patent No.: US 11,971,252 B2
(45) Date of Patent: Apr. 30, 2024

(54) INDUCTIVE POSITION MEASURING SENSOR

(71) Applicant: Jia Hao, Beijing (CN)

(72) Inventor: Jia Hao, Beijing (CN)

( * ) Notice: Subject to any disclaimer, the term of this patent is extended or adjusted under 35 U.S.C. 154(b) by 245 days.

(21) Appl. No.: 17/312,931

(22) PCT Filed: Nov. 5, 2019

(86) PCT No.: PCT/CN2019/115560
§ 371 (c)(1),
(2) Date: Jun. 10, 2021

(87) PCT Pub. No.: WO2020/207000
PCT Pub. Date: Oct. 15, 2020

(65) Prior Publication Data
US 2022/0120551 A1    Apr. 21, 2022

(30) Foreign Application Priority Data

Apr. 11, 2019   (CN) .......................... 201920482053.X

(51) Int. Cl.
*G01B 7/00*     (2006.01)
*G01D 5/20*     (2006.01)

(52) U.S. Cl.
CPC ........... *G01B 7/003* (2013.01); *G01D 5/2086* (2013.01)

(58) Field of Classification Search
CPC .............................. G01D 5/2086; G01B 7/003
See application file for complete search history.

(56) References Cited

U.S. PATENT DOCUMENTS

| 5,973,494 A | 10/1999 | Masreliez et al. |
| 6,005,387 A * | 12/1999 | Andermo ............ G01D 5/2086 324/207.17 |

(Continued)

FOREIGN PATENT DOCUMENTS

| CN | 2II6888 U | 9/1992 |
| CN | 1439861 A | 9/2003 |

(Continued)

OTHER PUBLICATIONS

Extended European Search Report, Jan. 5, 2022, Application No. 19924383.3-1010/Patent No. 387244.

(Continued)

*Primary Examiner* — Jermele M Hollington
*Assistant Examiner* — Suresh K Rajaputra
(74) *Attorney, Agent, or Firm* — David R. Stevens; Stevens Law Group

(57) ABSTRACT

An inductive position measuring sensor comprises a fixed ruler and a sliding ruler which can move relatively along the direction of the measuring axis. A series of coupling coils are made on the fixed ruler in the measuring direction,-two sets of driving coils are disposed on the sliding ruler, and induction coils in a staggered manner are also disposed on the sliding ruler. The two sets of driving coils generate excitation signals, by interaction with the coupling coils on the fixed ruler, and being received by the induction coils of the sliding ruler, they are used for measuring the relative movement of the fixed ruler and the sliding ruler. By controlling the positions and winding directions of the driving coils and the induction coils, the sensor can effectively inhibit the direct space signal interference of the driving coils to the induction coils, and the signal-to-noise ratio is improved.

19 Claims, 5 Drawing Sheets

(56) References Cited

U.S. PATENT DOCUMENTS

| | | | | |
|---|---|---|---|---|
| 6,400,138 B1* | 6/2002 | Andermo | ............... | G01B 3/205 |
| | | | | 324/207.17 |
| 2008/0018328 A1* | 1/2008 | Meyer | .................... | G01D 5/202 |
| | | | | 324/207.15 |
| 2013/0090890 A1* | 4/2013 | Meyer | .................. | G01D 5/2452 |
| | | | | 702/150 |
| 2018/0058883 A1* | 3/2018 | Cook | .................... | G01D 5/202 |
| 2019/0301896 A1* | 10/2019 | Jones | .................. | G01D 5/2497 |

FOREIGN PATENT DOCUMENTS

| | | | |
|---|---|---|---|
| CN | 1470847 | A | 1/2004 |
| CN | 105444659 | A | 3/2016 |
| CN | 107782343 | A | 3/2018 |
| CN | 107796293 | A | 3/2018 |
| CN | 209605843 | | 11/2019 |
| EP | 0053091 | | 6/1982 |
| EP | 2851655 | A1 | 6/2014 |
| EP | 2549239 | | 4/2018 |
| SE | 7714010 | | 12/1977 |

OTHER PUBLICATIONS

Search Report and Written Opinion, PCT/CN2019/115560, dated Apr. 11, 2019.

\* cited by examiner

INDUCTIVE POSITION MEASURING SENSOR

CROSS-REFERENCE TO RELATED APPLICATIONS

This application claims priority to Chinese Patent Application No. 201920482053.X filed on Apr. 11, 2019 entitled INDUCTIVE POSITION MEASURING SENSOR, which is incorporated by reference in the present application in its entirety.

TECHNICAL FIELD

The invention relates to the technical field of sensors, and in particular to an inductive position measuring sensor, which is suitable for making electronic digital display calipers, electronic digital display indicators, sensors for measuring relative positions and the like.

BACKGROUND

Traditional mechanical vernier calipers are gradually replaced by electronic digital display calipers.

At present, the most widely used electronic digital display calipers adopt a capacitive position sensor. The description of the electronic digital display caliper using this principle can refer to SE7714010 and European Patent EP0053091. Although the electronic digital caliper using this principle has higher accuracy and lower power consumption, it has certain requirements for the usage environment. In a humid or oily environment, it does not work properly, causing reading errors. In actual work, it is difficult to avoid this environment, which affects the scope of use of this electronic digital display caliper.

Using an inductive position sensor to measure the position is a way to solve the problem that electronic measuring tools such as electronic digital display calipers can work normally in environments such as humid environment or lubricating oil and dust environment. In the U.S. Pat. No. 5,973,494, an electronic caliper using an inductive position sensor is introduced. The inductive position sensor involved in the patent puts the magnetic field generator and the magnetic flux sensor at the same position, when the magnetic field generator generates the magnetic field signal, part of the magnetic field signal can also enter the magnetic flux sensor at the same time to influence the received signal of the magnetic flux sensor, thereby affecting the measurement result.

A reduced offset high accuracy induced current position transducer is introduced in U.S. Pat. No. 6,005,387. The transducer involved uses a single-channel magnetic field generator, and the output signal generated by each magnetic flux sensitive element is insensitive to the magnetic flux generated by the magnetic field generator, through the way that the spatial magnetic fields mutually offset in the same magnetic flux sensitive element. The application of this type of transducer has certain limitations, and it can only be applied to a specific measurement circuit with a single-channel drive. When the measurement circuit connected to the transducer needs to have dual-channel drives, this type of transducer cannot be used. Increasing the number of drive channels can increase the number of measurement points in the measurement cycle without increasing the number of induction coil channels, reduce the requirements for circuits or sensors, and improve measurement accuracy.

SUMMARY OF THE INVENTION

The purpose of the present application is to provide an inductive position measuring sensor that can be used in a dual-channel drive electromagnetic induction measurement circuit. This sensor can effectively reduce the coupling interference between the coils in the sensor, and has the characteristics, such as simple structure, convenient manufacture, and high measurement accuracy, and can work normally in humid and oily environments.

Specifically, the present application provides an inductive position measuring sensor, which comprises a fixed ruler and a sliding ruler relatively movable along a direction of a measuring axis; a series of coupling coils arranged on the fixed ruler along a measuring direction; two sets of driving coils and staggered arrangement induction coils are made on the slide rule; wherein, excitation signals are generated by the two sets of driving coils, and received by the induction coils of the sliding ruler through introduction with the coupling coils on the fixed ruler, for measuring the relative movement of the fixed ruler and the sliding ruler;

the two sets of driving coils on the sliding ruler generate the excitation signals in turn, each set of driving coils comprises two excitation coils, all of the four excitation coils are of the same size and shape, and the centers of the four excitation coils are respectively arranged on four corners of the rectangle which are symmetrically located about the measuring axis;

two or more sets of induction coils arranged on the sliding ruler in a staggered manner, the induction coil is composed of a plurality of measurement coils arranged at interval in a winding direction in series, arranged along the measuring axis, and respectively forming two measurement areas in the middle of the two excitation coils, the measuring coils at the same position in the two measurement areas are connected in series, and the measuring coils at the same position in the two measurement areas are at the same distance from the exciting coils thereto.

Optionally, the coupling coils on the fixed ruler comprises four conductive loops having different shapes and different winding directions and arranged crosswise, and the conductive loop has an interval period of 2T; when one set of driving coils generates excitation signals, only two of the four conductive loops in the same interval period are coupled.

Optionally, the period of the measuring coils arranged at interval in the winding direction on the sliding ruler is 2T, and the measuring coils belonging to different sets of induction coils are uniformly arranged in a period of T.

Optionally, the two sets of driving coils on the sliding ruler are symmetrically arranged about the measuring axis, and the two excitation coils of each set of driving coils are connected in series with opposite current flow directions.

Optionally, the interval between the center of the excitation coil and the center of the measurement area along the direction of the measuring axis is an odd number of T, where T is half of the interval period of the conductive loop.

Optionally, the measuring coils at the same position in the two measurement areas of the sliding ruler have the same winding direction, and the directions of the current coupled by the conductive loops on the fixed ruler and induced by the two measuring coils are the same.

Optionally, the two sets of driving coils on the sliding ruler are symmetrically arranged along the measuring axis, and the two excitation coils in each set of driving coils are connected in series with the same current flow directions.

Optionally, the measuring coils at the same position in the two measurement areas of the sliding ruler have the opposite winding direction, and the directions of the current coupled by the conductive loops on the fixed ruler and induced by the two measuring coils are opposite.

Optionally, the two excitation coils in the two sets of driving coils on the sliding ruler are arranged crosswise on both sides of the measuring axis, and two excitation coils in each set of driving coils are connected in series with opposite current flow directions.

Optionally, the measuring coils at the same position in the two measurement areas of the sliding ruler have the same winding direction.

Optionally, the two excitation coils in the two sets of driving coils on the sliding ruler are arranged crosswise on both sides of the measuring axis, and two excitation coils in each set of driving coils are connected in series with the same current flow directions Optionally, the measuring coils at the same position in the two measurement areas of the sliding ruler have the opposite winding direction.

The present application has the following technical advantages:
1. By controlling the positions and winding directions of the driving coils and the induction coils, the direct coupling signals on the induction coils of the dual-channel driving coils that alternately generate the excitation signals can be reduced or mutually offset, and the indirect coupling signals on the induction coils can be increased at the same time.
2. In order to offset the excitation signals which are generated by the excitation coils and directly coupled to the induction coils, the present application adopts the following solution:

The two sets of driving coils on the sliding ruler respectively include two excitation coils, all of the four excitation coils are of the same size and shape, and the centers of the four excitation coils are respectively arranged on the four corners of the rectangle which are symmetrically located about the measuring axis. Two or more sets of induction coils are arranged on the sliding ruler in a staggered manner. The induction coil is composed of a plurality of measurement coils arranged at interval in a winding direction in series, and arranged along the measuring axis, and respectively forming two measurement areas in the middle of the two excitation coils. The measuring coils at the same position in the two measurement areas are in a series relationship, and the measuring coils at the same position in the two measurement areas are at the same distance from the exciting coils thereto. A certain distance exits between the two measurement areas to reduce the coupling interference of the non-adjacent excitation coils with the measuring coils. Under ideal conditions, only the influence of the adjacent coils can be considered.

The coupling coil on the fixed ruler comprises four conductive loops having different shapes and different winding directions arranged crosswise, and the conductive loops has an interval period of 2T, and the two conductive loops with a distance of T have opposite winding directions.

3. The two sets of driving coils in the sensor alternately generate excitation signals, only two of the four conductive loops in the same interval period on the fixed ruler are coupled when one set of driving coils generates excitation signals. The excitation signals are induced by the coupling coils on the fixed ruler, and received by the induction coils of the sliding ruler, which can realize the measurement of the relative movement of the fixed ruler and the sliding ruler.

The purpose of present application is achieved by the following two methods.

Method 1: The two sets of excitation coils on the sliding ruler are arranged symmetrically along the measuring axis, and each set of driving coils comprises two excitation coils with the same shape. The two excitation coils are connected in series with opposite current flow directions and are arranged along the direction of the measuring axis, with the interval between the centers being 2NT+T, where N is a natural number, and T is half of the interval period of the conductive loop. The induction coils on the sliding ruler are arranged in a staggered manner along the measuring axis, two areas are formed at positions corresponding to the excitation coils, and the interval between the centers of the induction coils is also 2NT+T. The measuring coils at the same position in the two areas are the same set of induction coils, and are at the same distance from the centers of two excitation coils adjacent thereto in the same set of driving coils. The measuring coils at the same position in the two areas have the same current flow directions. When one set of driving coils generates the excitation signal, on one hand, because the current directions of the two excitation coils are opposite, for the two measuring coils that are in the same relative position to the two excitation coils and are of the same direction of the induced current, the direct coupling signals between the two measuring coils and the excitation coils can mutually offset. On the other hand, the interval between the center of the two excitation coils in the same set of driving coils and the center of the measurement area along the direction of the measuring axis is 2NT+T, and the conductive loops at the interval T on the fixed ruler has opposite winding directions, and the indirect coupling signals of the two excitation coils through the conductive loops on the fixed ruler and induced by the two measuring coils at the same position in the two measurement areas are in the same direction. Since the two measuring coils are connected in series in the same direction, the indirect coupling signals passing through the conductive loop on the fixed ruler are increased.

Method 2: The two sets of excitation coils on the sliding ruler are arranged symmetrically along the measuring axis, and each set of driving coils comprises two excitation coils with the same shape. The two excitation coils are connected in series with same current flow directions, and are arranged along the direction of the measuring axis with the interval between the centers being 2NT+T, where N is a natural number, and T is half of the interval period of the conductive loop. The induction coils on the sliding ruler are arranged in a staggered manner along the measuring axis, two areas are formed at positions corresponding to the excitation coils, and the interval between the centers of the induction coils is also 2NT+T. The measuring coils at the same position in the two areas are the same set of induction coils, and are at the same distance from the centers of two excitation coils adjacent thereto in the same set of driving coils. The measuring coils at the same position in the two areas have the opposite current flow directions. When one set of driving coils generates the excitation signals, on one hand, because the current directions of the two excitation coils are same, for the two measuring coils that are in the same relative position to the two excitation coils and are of the opposite direction of the induced current, the direct coupling signals between the two measuring coils and the excitation coils can mutually offset. On the other hand, the intervals between the center of the two excitation coils in the same set of driving coils and the center of the measurement area is 2NT+T along the direction of the measuring axis, and the conductive loops at the interval T on the fixed ruler has opposite winding directions, and the indirect coupling signals of the two excitation coils through the conductive loops on the fixed ruler and induced by the two measuring coils at the same position in the two measurement areas are in the opposite direction. Since the two measuring coils are connected in series in the opposite direction, the indirect coupling signals passing through the conductive loop on the fixed ruler are increased.

The sensor according to the present application can allow the direct coupling signals on the same set of induction coils of the dual-channel driving coils to be reduced or mutually offset, and allow the indirect coupling signals on the same set of induction coils to be increased, so as to reduce interference and improve the purpose of measurement accuracy. The present application adopts a pattern symmetry method to eliminate the coupling between the two excitation coils and the induction coils in the same set. It is necessary to ensure the dimensional accuracy and position accuracy of the sensor pattern with the existing circuit board photoetching process, and these requirements can be ensured. Therefore, the sensor according to the present application can be fabricated on a printed circuit board using the existing mature technology, which reduces the cost of manufacturing the sensor; if higher dimensional accuracy and position accuracy are required, glass, ceramic or silicon wafers can be used as a substrate by means of coating and etching. Hereinafter, a preferred embodiment of the inductive position measuring sensor of the present application will be described in detail with reference to the accompanying drawings

DETAILED DESCRIPTION

Figure 1:
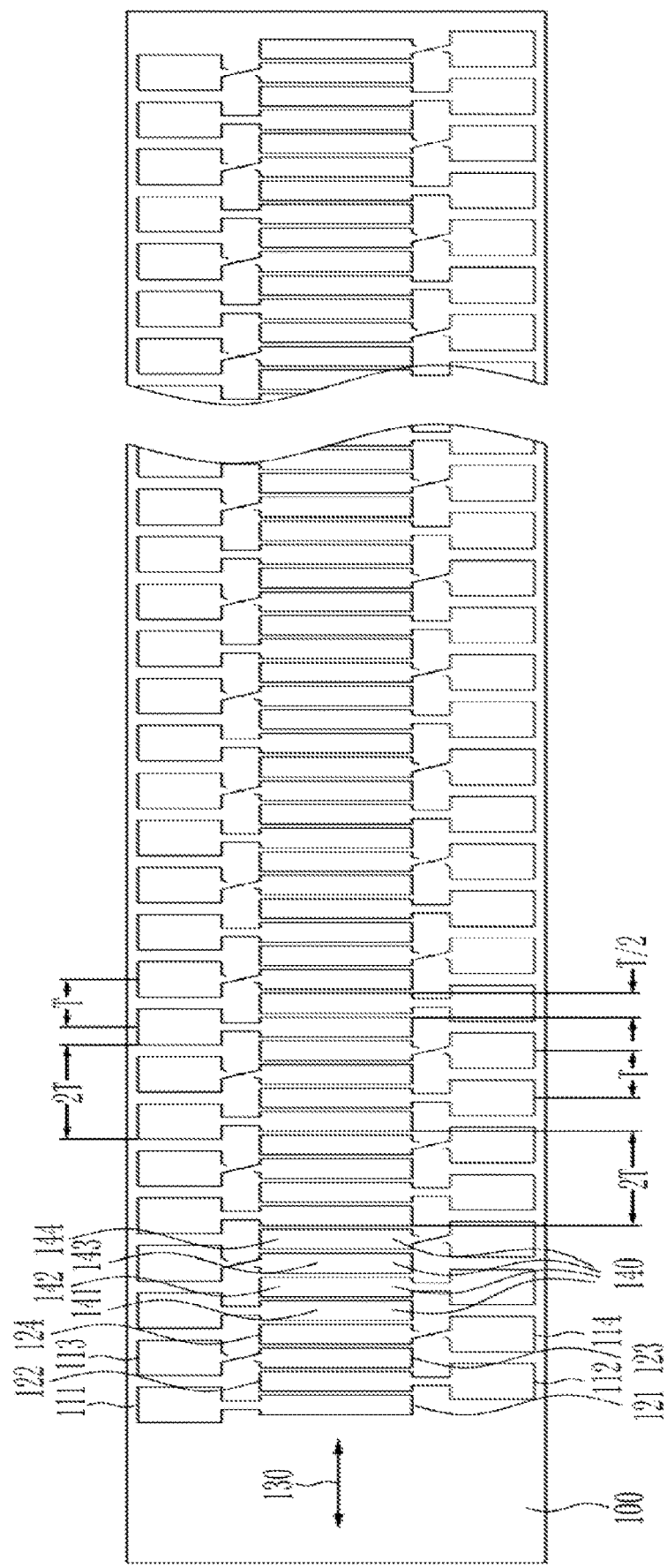
FIG. 1 is a fixed ruler of the inductive position measuring sensor according to the present application.

The fixed ruler 100 of the inductive position measuring sensor according to the present application is shown in FIG. 1.

A series of coupling coils 140 are fabricated on the fixed ruler 100 along a measuring direction. These coupling coils comprises four conductive loops 141, 142, 143, and 144 having different shapes and different winding directions arranged crosswise in a period of 2T.

The conductive loop 141 is formed by the conductive member 111 and the conductive member 121 being connected in the same direction; and the conductive loop 143 is formed by the conductive member 113 and the conductive member 123 being cross connected. The conductive loop 142 is formed by the conductive member 112 and the conductive member 122 being connected in the same direction; and the conductive loop 144 is formed by the conductive member 114 and the conductive member 124 being cross connected. In this way, the two conductive loops at the internal of T along the measuring axis 130 have the opposite winding directions.

The conductive members 111 and 113 are arranged at interval on one side of the measuring axis 130, and the interval of the centers of the conductive members 111 and 113 is T; the conductive members 112 and 114 are arranged at interval on the other side of the measuring axis 130, and the interval of the centers of the conductive members 112 and 114 is T.

The conductive members 121, 122, 123, and 124 are arranged at interval of 2T along the measuring axis 130.

When the conductive members 111 and 113 are applied with the same excitation signals, the directions of the induced currents in the conductive members 121 and 123 are opposite. When the conductive members 112 and 114 are applied with the same excitation signals, the directions of the induced currents in the conductive members 122 and 124 are opposite.

Figure 2:
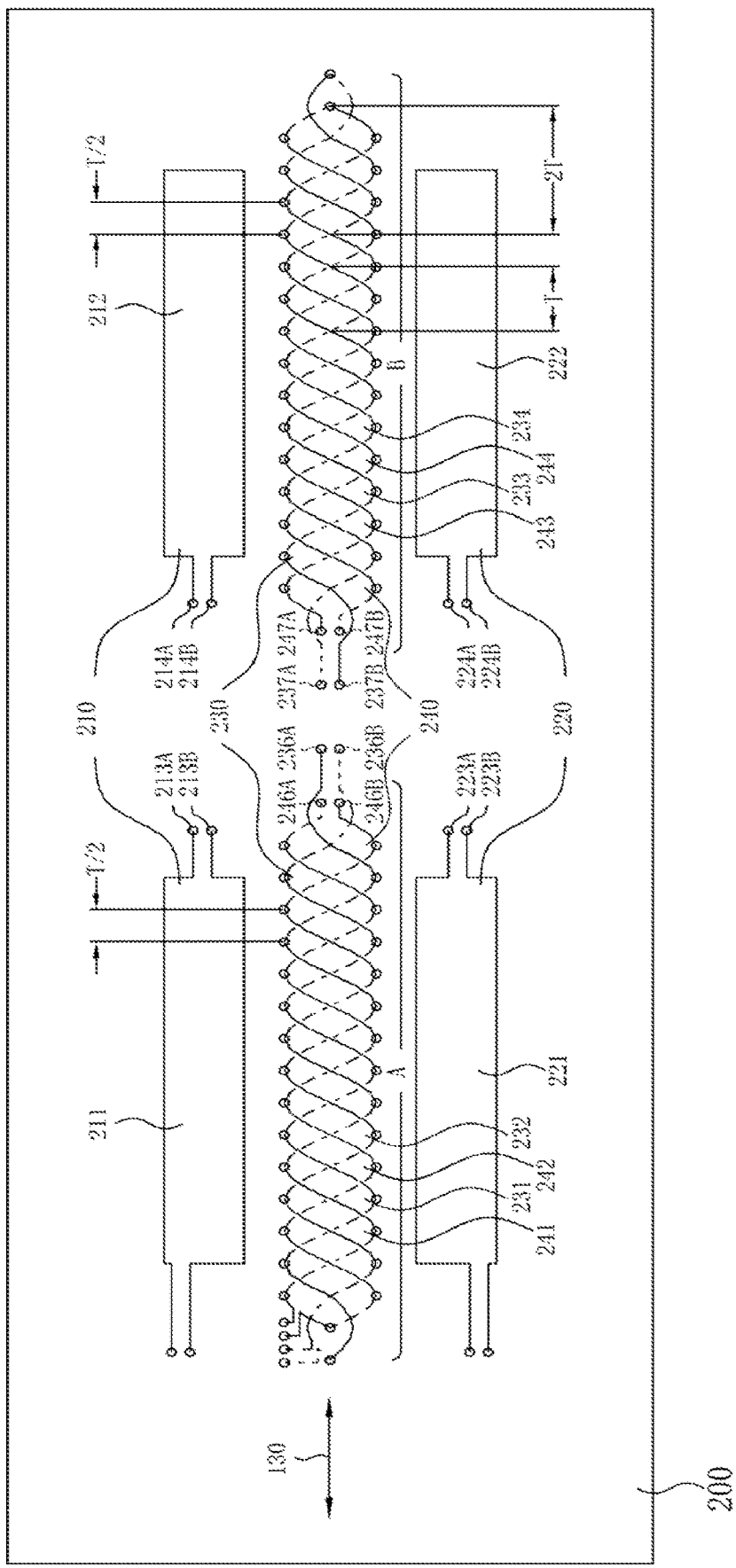
FIG. 2 is a sliding ruler of the inductive position measuring sensor according to the present application.

The sliding ruler 200 of the inductive position measuring sensor according to the present application is shown in FIG. 2.

Two sets of driving coils 210 and 220 are fabricated on the sliding ruler 200 opposite to the fixed ruler 100, and the two sets of driving coils 210 and 220 on the sliding ruler 200 generate excitation signals in turn. The driving coil 210 comprises excitation coils 211 and 212, and the driving coil 220 comprises excitation coils 221 and 222. All of the four excitation coils are of the same size and shape, and the centers of the four excitation coils are respectively arranged on four corners of the rectangle which are symmetrical located about the measuring axis 130.

Through the connection of the connecting wires 213A, 213B and the connecting wires 214A, 214B, the excitation coils 211 and 212 can be connected in series on the circuit. By changing the connection sequence of the connecting wires 213A, 213B and the connecting wires 214A, 214B, the excitation coils 211 and 212 can be connected in the same direction or in the reverse direction. The excitation coils 211 and 212 are arranged opposite to the conductive members 111 and 113 in FIG. 1 to form a coupling relationship.

Through the connection of the connecting wires 223A, 223B and the connecting wires 224A, 224B, the excitation coils 221 and 222 can be connected in series on the circuit. By changing the connection sequence of the connecting wires 223A, 223B and the connecting wires 224A, 224B, the excitation coils 221 and 222 can be connected in the same direction or in the reverse direction. The excitation coils 221 and 222 are arranged opposite to the conductive members 112 and 114 in FIG. 1 to form a coupling relationship.

Two sets of induction coils 230 and 240 are arranged in a staggered manner along the measuring axis 130 on the sliding rule 200 opposite to the fixed ruler 100. The induction coil 230 comprises a plurality of measuring coils 231 and 232 arranged at interval in series. The measuring coils 231 and 232 have the opposite winding directions, and the interval between them is T, which is arranged at a periodic interval of 2T; the induction coil 240 comprises a plurality of measuring coils 241 and 242 arranged at interval in series. The measuring coils 241 and 242 have the opposite winding directions, and the interval between them is T, which is arranged at a periodic interval of 2T. The interval between the induction coils 230 and 240 is T/2.

The induction coils 230 and 240 are arranged along the measuring axis 130, respectively forming two identical measurement areas A and B in the middle of the two excitation coils. The center lines of the measurement areas A and B coincide with the center lines of the upper and lower excitation coils, so that the measuring coils at the same position in the two measurement areas A and B are at the same distance from the excitation coils located adjacent the measuring coils. The measuring coils 231, 232, 241 and 242 in the measurement areas A and B are arranged opposite to and coupled with the conductive members 121, 122, 123, 124 in FIG. 1.

Through the connection of the connecting wires 236A, 236B and the connecting wires 237A, 237B, the measuring coils 231 and 233 at the same position can be connected in series on the circuit. By changing the connection sequence of the connecting wires 236A, 236B and the connecting wires 237A, 237B, the winding directions of the measuring coils 231 and 233 can be the same or reversed.

Through the connection of the connecting wires 246A, 246B and the connecting wires 247A, 247B, the measuring coils 241 and 243 at the same position can be connected in series on the circuit. By changing the connection sequence of the connecting wires 246A, 246B and the connecting wires 247A, 247B, the winding directions of the measuring coils 241 and 243 can be the same or reversed.

Figure 3:
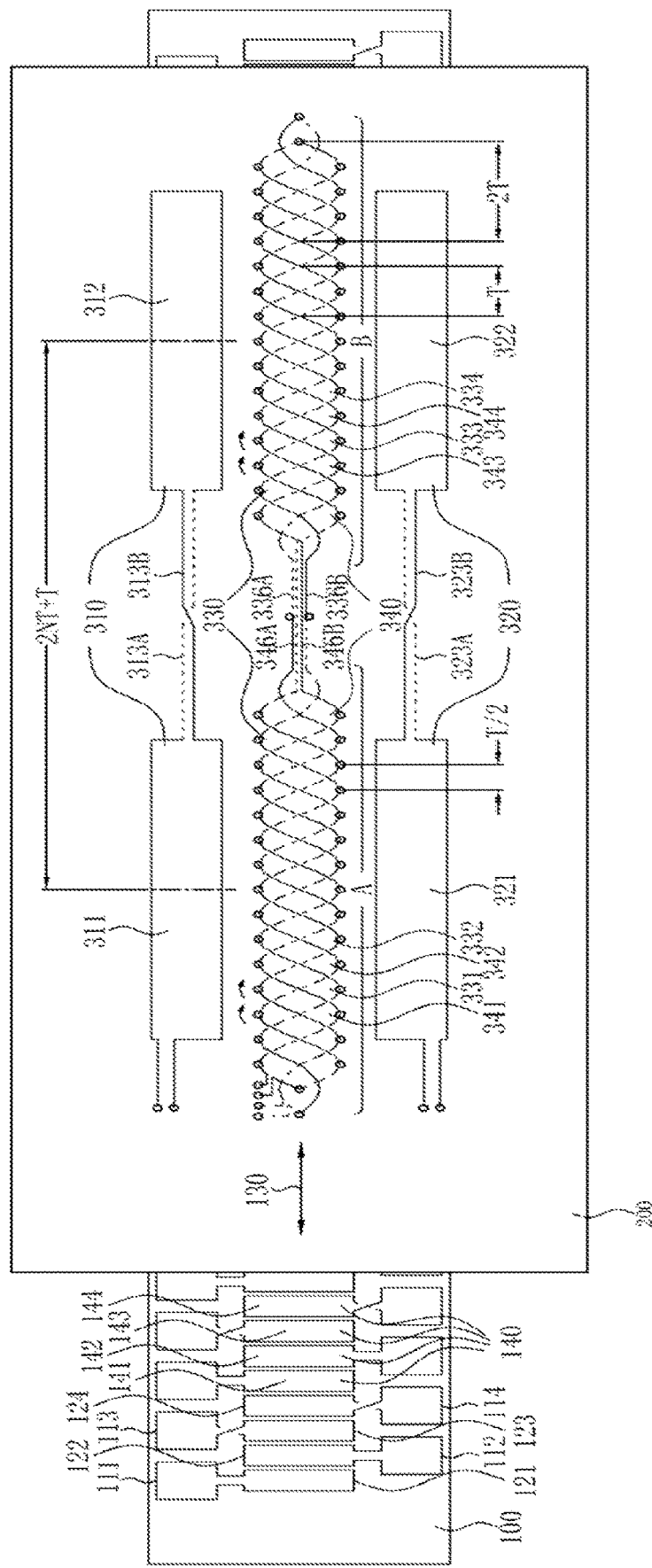
FIG. 3 is a first preferred embodiment of the inductive position measuring sensor according to the present application.

FIG. 3 is a first preferred embodiment of the inductive position measuring sensor according to the present application.

The inductive position measuring sensor comprises a fixed ruler 100 and a sliding ruler 200 relatively movable along a direction of a measuring axis 130. The graphics planes in the fixed ruler 100 and the sliding ruler 200 are opposite. In order to ensure that the lines in the drawing are clear, the sliding ruler 200 part is represented by a perspective method.

The driving coil 310 comprises excitation coils 311 and 312, which are coupled with the conductive members 111 and 113 on the fixed ruler 100. The excitation coils 311 and 312 are connected in series through connecting wires 313A and 313B and have opposite winding directions. The driving coil 320 comprises excitation coils 321 and 322, which are coupled with the conductive members 112 and 114 on the fixed ruler 100. The excitation coils 321 and 322 are connected in series through connecting wires 323A and 323B and have opposite winding directions. All of the four excitation coils are of the same size and shape, and the centers of the four excitation coils are respectively arranged on four corners of the rectangle which are symmetrically located about the measuring axis 130.

Two sets of induction coils 330 and 340 are arranged in a staggered manner along the measuring axis 130 on the sliding ruler 200, which are coupled with the conductive members 121, 122, 123 and 124 on the fixed ruler 100. Through the connecting wires 336A, 336B, the induction coil 330 causes measuring coils 331 and 333 at the same position in the measurement areas A and B to be connected in series and to have the same winding direction. Through the connecting wires 346A, 346B, the induction coil 340 causes measuring coils 341 and 343 at the same position in the measurement areas A and B to be connected in series and to have the same winding direction.

The intervals between the centers of the excitation coils 311 and 312, the centers of the excitation coils 321 and 322, and the centers of the measurement areas A and B along the direction of the measuring axis are respectively 2NT+T, where N is an integer.

Under ideal conditions, when one set of excitation coils generates excitation signals, the currents induced by the measuring coils at the same position in the two induction zones A and B are equal in magnitude and opposite in direction. Since the measuring coils at the same position are connected in series and have the same winding direction, the induced currents can mutually offset. Therefore, the direct coupling signal of the driving coils 310 and 320 and the induction coils 330 and 340 can be greatly reduced or mutually offset.

The two sets of driving coils 310 and 320 on the sliding ruler 200 generate excitation signals in turn, which are coupled to the induction coils through conductive loops 141, 142, 143 and 144, respectively. Since the two driving coils in the same set have opposite winding directions and the distance of 2NT+T away from the center of the excitation coils, and the conductive loops arranged at interval of T on the sliding ruler have opposite winding directions, therefore, through the conductive loops on the fixed ruler, the coupling signals generated by the two excitation coils of the driving coils in the same set on the measuring coils at the same position in the two measurement areas are in the same direction. Since the two measuring coils have the same winding directions, the signals are strengthened.

Therefore, the purpose of reducing direct coupling and strengthening indirect coupling can be achieved by the sensor shown in FIG. 3.

Figure 4:
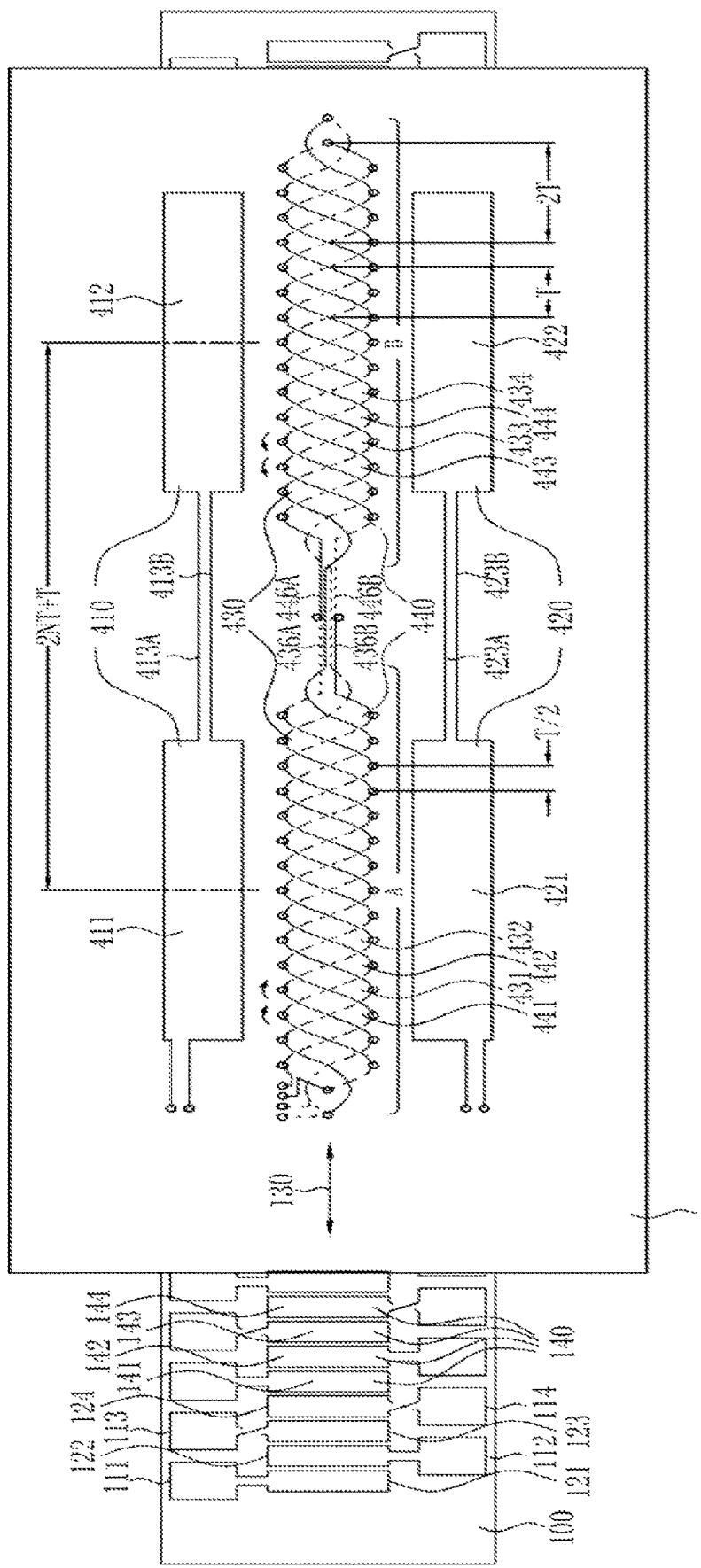
FIG. 4 is a second preferred embodiment of the inductive position measuring sensor according to the present application.

FIG. 4 is a second preferred embodiment of the inductive position measuring sensor according to the present application.

The inductive position measuring sensor comprises a fixed ruler 100 and a sliding ruler 200 relatively movable along a direction of a measuring axis 130. The graphics planes in the fixed ruler 100 and the sliding ruler 200 are opposite. In order to ensure that the lines in the drawing are clear, the sliding ruler 200 part is represented by a perspective method.

The driving coil 410 comprises excitation coils 411 and 412, which are coupled with the conductive members 111 and 113 on the fixed ruler 100. The excitation coils 411 and 412 are connected in series through connecting wires 413A and 413B and have same winding directions. The driving coil 420 comprises excitation coils 421 and 422, which are coupled with the conductive members 112 and 114 on the fixed ruler 100. The excitation coils 421 and 422 are connected in series through connecting wires 423A and 423B and have same winding directions. All of the four excitation coils are of the same size and shape, and the centers of the four excitation coils are respectively arranged on four corners of the rectangle which are symmetrically located about the measuring axis 130.

Two sets of induction coils 430 and 440 are arranged in a staggered manner along the measuring axis 130 on the sliding ruler 200, which are coupled with the conductive members 121, 122, 123 and 124 on the fixed ruler 100. Through the connecting wires 436A, 436B, the induction coil 430 causes measuring coils 431 and 433 at the same position in the measurement areas A and B to be connected in series and to have the opposite winding direction. Through the connecting wires 446A, 446B, the induction coil 440 causes measuring coils 441 and 443 at the same position in the measurement areas A and B to be connected in series and to have the opposite winding direction.

The intervals between the centers of the excitation coils 411 and 412, the centers of the excitation coils 421 and 422, and the centers of the measurement areas A and B along the direction of the measuring axis are respectively 2NT+T, where N is an integer.

Under ideal conditions, when one set of excitation coils generates excitation signals, the currents induced by the measuring coils at the same position in the two induction zones A and B are equal in magnitude and same in direction. Since the measuring coils at the same position are connected in series and have the opposite winding direction, the induced currents can mutually offset. Therefore, the direct coupling signal of the driving coils 410 and 420 and the induction coils 430 and 440 can be greatly reduced or mutually offset.

The two sets of driving coils 410 and 420 on the sliding ruler 200 generate excitation signals in turn, which are coupled to the induction coils through conductive loops 141, 142, 143 and 144, respectively. Since the two driving coils in the same set have opposite winding directions and the distance of 2NT+T away from the center of the excitation coils, and the conductive loops arranged at interval of T on the sliding ruler have opposite winding directions, therefore, through the conductive loops on the fixed ruler, the coupling signals generated by the two excitation coils of the driving coils in the same set on the measuring coils at the same position in the two measurement areas are in the opposite direction. Since the two measuring coils have the opposite winding directions, the signals are strengthened.

Therefore, the purpose of reducing direct coupling and strengthening indirect coupling can be achieved by the sensor shown in FIG. 4.

Figure 5:
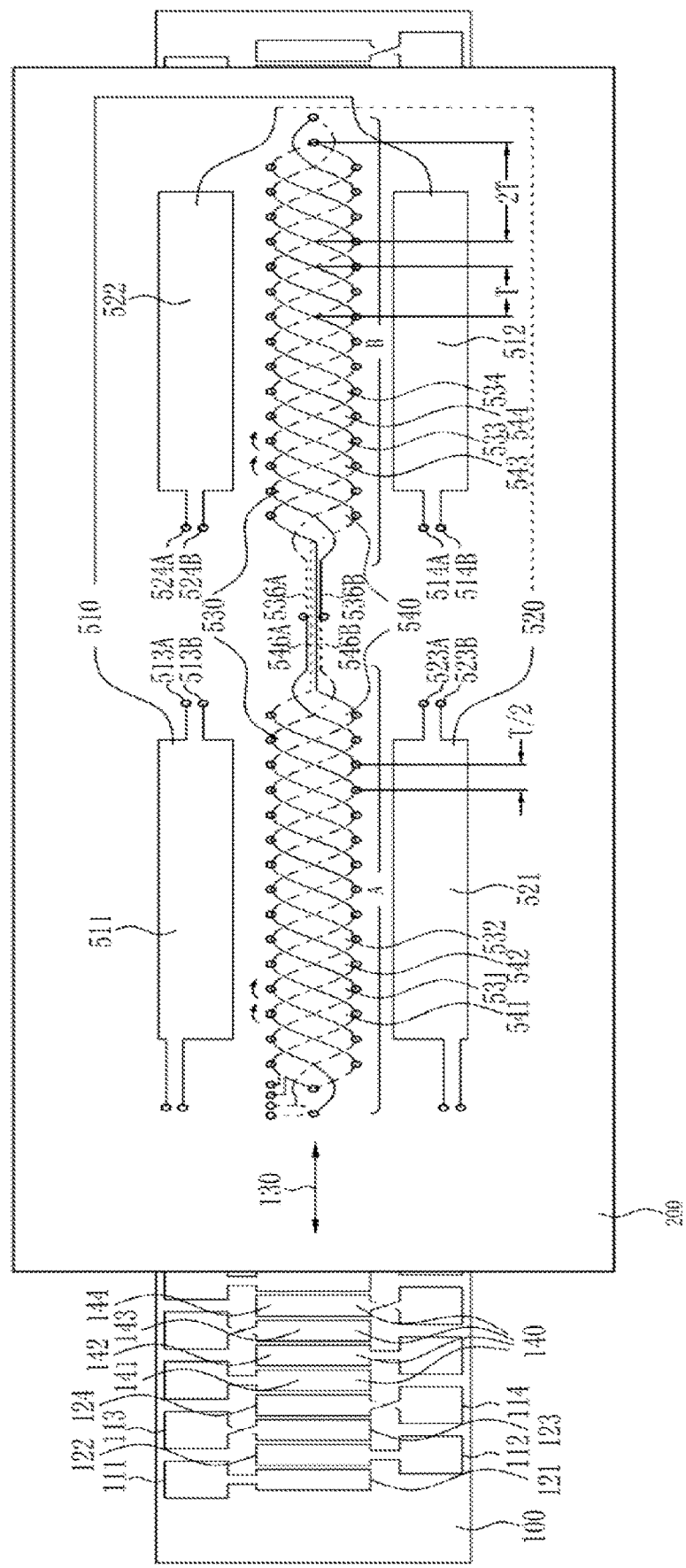
FIG. 5 is a third preferred embodiment of the inductive position measuring sensor according to the present application.

FIG. 5 is a third preferred embodiment of the inductive position measuring sensor according to the present application.

The inductive position measuring sensor comprises a fixed ruler 100 and a sliding ruler 200 relatively movable along a direction of a measuring axis 130. The graphics planes in the fixed ruler 100 and the sliding ruler 200 are opposite. In order to ensure that the lines in the drawing are clear, the sliding ruler 200 part is represented by a perspective method.

The driving coil 510 comprises excitation coils 511 and 512. By connecting the connecting wires 513A and 514B and connecting the connecting wires 513B and 514A, the excitation coils 511 and 512 are connected in series and have opposite winding directions. The driving coil 520 comprises excitation coils 521 and 522. By connecting the connecting wires 523A and 524B and connecting the connecting wires 523B and 524A, the excitation coils 521 and 522 are connected in series and have opposite winding directions. The centers of the excitation coils in the same set are respectively arranged on diagonally opposite corners of the rectangle which are symmetrically located about the measuring axis 130.

Two sets of induction coils 530 and 540 are arranged in a staggered manner along the measuring axis 130 on the sliding ruler 200, which are coupled with the conductive members 121, 122, 123 and 124 on the fixed ruler 100. Through the connecting wires 536A, 536B, the induction coil 530 causes measuring coils 531 and 533 at the same position in the measurement areas A and B to be connected in series and to have the same winding direction. Through the connecting wires 546A, 546B, the induction coil 540 causes measuring coils 541 and 543 at the same position in the measurement areas A and B to be connected in series and to have the same winding direction.

The interval between the centers of the excitation coils 511 and 512, the centers of the excitation coils 521 and 522, and the centers of the measurement areas A and B along the direction of the measuring axis is 2NT+T, where N is an integer.

Under ideal conditions, when one set of excitation coils generates excitation signals, the currents induced by the measuring coils at the same position in the two induction zones A and B are equal in magnitude and opposite in direction. Since the measuring coils at the same position are connected in series and have the same winding direction, the induced currents can mutually offset. Therefore, the direct coupling signal of the driving coils 510 and 520 and the induction coils 530 and 540 can be greatly reduced or mutually offset.

The two sets of driving coils 510 and 520 on the sliding ruler 200 generate excitation signals in turn, which are coupled to the induction coils through conductive loops 141, 142, 143 and 144, respectively. Since the two driving coils in the same set have same winding directions and the interval along the direction of the measuring axis is 2NT+T, through the conductive loops on the fixed ruler, the coupling signals generated by the two excitation coils of the driving coils in the same set on the measuring coils at the same position in the two measurement areas are strengthened.

Therefore, the purpose of reducing direct coupling and strengthening indirect coupling can be achieved by the sensor shown in FIG. 5.

The layout and connection of the inductive position measuring sensor as shown in FIG. 5, only the two excitation coils in the same set need to be connected in series in the same direction, and at the same time, the measuring coils at the same position in the two induction zones A and B are connected in the opposite winding direction, and the purpose of the third preferred embodiment as shown in FIG. 5 can also be achieved.

The scope of the present application is not limited to the embodiments described herein, and there may be many variations. The length of the excitation coil shown in the figures along the measuring axis is shorter than the length of the measurement area, and the length of the excitation coil can also be designed to be longer than the length of the measurement area. The figures are described with two sets of induction coils as examples. The number of sets of induction coils can also be designed into more than two groups according to the actual circuit, as long as the measuring coils belonging to different sets of induction coils are evenly arranged in a period of T. The purpose of measurement can also be achieved by properly changing the shapes of the coils. The measurement of angular displacement can also be achieved by fabricating the sensor described in the present application on a circular path.

When applied to the occasions where there is a large-scale space along the measuring axis, the excitation coils in each set of driving coils can be increased to more than 2 even numbers of coils, and the middle measurement area is also increased to the corresponding even number of areas, so that the arrangement can better suppress interference.

The invention claimed is:

1. An inductive position measuring sensor, comprising a fixed ruler and a sliding ruler relatively movable along a direction of a measuring axis;
    a series of coupling coils arranged on the fixed ruler along a measuring direction;
    two sets of driving coils are disposed on the sliding ruler, and induction coils arranged in a staggered mode are also disposed on the sliding ruler;
    wherein, excitation signals are generated by the two sets of driving coils, and received by the induction coils of the sliding ruler through introduction with the coupling coils on the fixed ruler, for measuring the relative movement of the fixed ruler and the sliding ruler;
    the two sets of driving coils on the sliding ruler generate the excitation signals in turn, each set of driving coils comprises two excitation coils, all of the four excitation coils are of the same size and shape, and the centers of the four excitation coils are respectively arranged on four corners of the rectangle which are symmetrically located about the measuring axis;

two or more sets of induction coils arranged on the sliding ruler in a staggered manner, the induction coil is composed of a plurality of measurement coils arranged at interval in a winding direction in series, arranged along the measuring axis, and respectively forming two measurement areas in the middle of the two excitation coils, the measuring coils at the same position in the two measurement areas are connected in series, and the measuring coils at the same position in the two measurement areas are at the same distance from the exciting coils thereto;

wherein, the coupling coils on the fixed ruler are comprised of four conductive loops having different shapes and different winding directions and arranged crosswise, and the conductive loop has an interval period of 2T; when one set of driving coils generates excitation signals, only two of the four conductive loops in the same interval period are coupled.

2. The inductive position measuring sensor of claim 1, wherein, the period of the measuring coils arranged at interval in the winding direction on the sliding ruler is 2T, and the measuring coils belonging to different sets of induction coils are uniformly arranged in a period of T.

3. The inductive position measuring sensor of claim 2, wherein the two sets of driving coils on the sliding ruler are symmetrically arranged about the measuring axis, and the two excitation coils of each set of driving coils are connected in series with opposite current flow directions.

4. The inductive position measuring sensor of claim 2, wherein the two sets of driving coils on the sliding ruler are symmetrically arranged along the measuring axis, and the two excitation coils in each set of driving coils are connected in series with the same current flow directions.

5. The inductive position measuring sensor of claim 1, wherein, the two sets of driving coils on the sliding ruler are symmetrically arranged about the measuring axis, and the two excitation coils of each set of driving coils are connected in series with opposite current flow directions.

6. The inductive position measuring sensor of claim 5, wherein, the interval between the center of the excitation coil and the center of the measurement area along the direction of the measuring axis is an odd number of T, where T is half of the interval period of the conductive loop.

7. The inductive position measuring sensor of claim 5, wherein, the measuring coils at the same position in the two measurement areas of the sliding ruler have the same winding direction, and the directions of the current coupled by the conductive loops on the fixed ruler and induced by the two measuring coils are the same.

8. The inductive position measuring sensor of claim 1, wherein, the two sets of driving coils on the sliding ruler are symmetrically arranged along the measuring axis, and the two excitation coils in each set of driving coils are connected in series with the same current flow directions.

9. The inductive position measuring sensor of claim 8, wherein, the interval between the center of the excitation coil and the center of the measurement area along the direction of the measuring axis is an odd number of T, where T is half of the interval period of the conductive loop.

10. The inductive position measuring sensor of claim 8, wherein, the measuring coils at the same position in the two measurement areas of the sliding ruler have the opposite winding direction, and the directions of the current coupled by the conductive loops on the fixed ruler and induced by the two measuring coils are opposite.

11. The inductive position measuring sensor of claim 1, wherein, the two excitation coils in the two sets of driving coils on the sliding ruler are arranged crosswise on both sides of the measuring axis, and two excitation coils in each set of driving coils are connected in series with opposite current flow directions.

12. The inductive position measuring sensor of claim 11, wherein, the interval between the center of the excitation coil and the center of the measurement area along the direction of the measuring axis is an odd number of T, where T is half of the interval period of the conductive loop.

13. The inductive position measuring sensor of claim 11, wherein, the measuring coils at the same position in the two measurement areas of the sliding ruler have the same winding direction.

14. The inductive position measuring sensor of claim 1, wherein, the two excitation coils in the two sets of driving coils on the sliding ruler are arranged crosswise on both sides of the measuring axis, and two excitation coils in each set of driving coils are connected in series with the same current flow directions.

15. The inductive position measuring sensor of claim 14, wherein, the measuring coils at the same position in the two measurement areas of the sliding ruler have the opposite winding direction.

16. The inductive position measuring sensor of claim 1, wherein the two sets of driving coils on the sliding ruler are symmetrically arranged about the measuring axis, and the two excitation coils of each set of driving coils are connected in series with opposite current flow directions.

17. The inductive position measuring sensor of claim 1, wherein the two sets of driving coils on the sliding ruler are symmetrically arranged along the measuring axis, and the two excitation coils in each set of driving coils are connected in series with the same current flow directions.

18. The inductive position measuring sensor of claim 1, wherein the two excitation coils in the two sets of driving coils on the sliding ruler are arranged crosswise on both sides of the measuring axis, and two excitation coils in each set of driving coils are connected in series with opposite current flow directions.

19. The inductive position measuring sensor of claim 1, wherein the two excitation coils in the two sets of driving coils on the sliding ruler are arranged crosswise on both sides of the measuring axis, and two excitation coils in each set of driving coils are connected in series with the same current flow directions.

* * * * *